United States Patent Office 3,097,081
Patented July 9, 1963

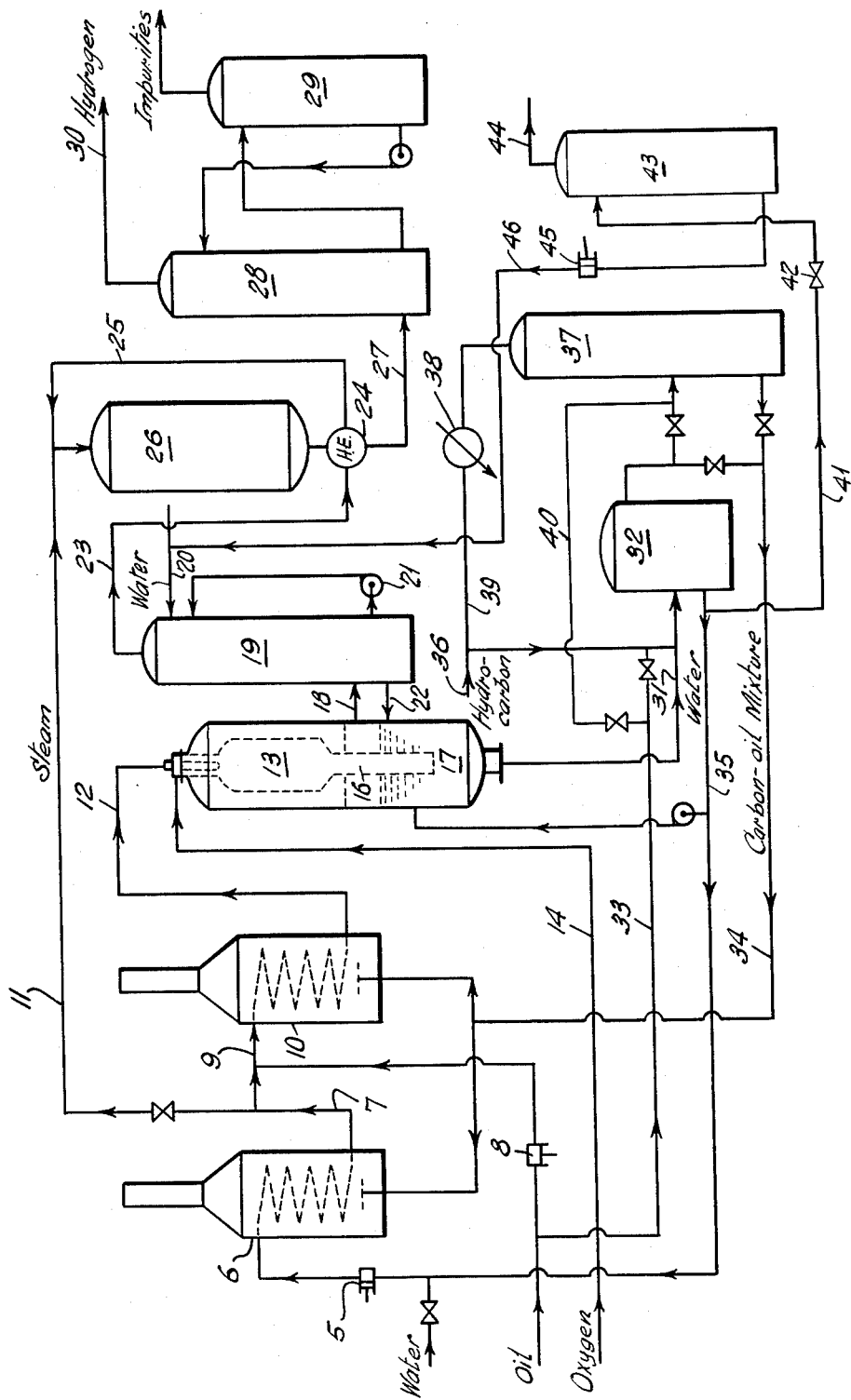

3,097,081
PRODUCTION OF SYNTHESIS GAS
Du Bois Eastman and Frank E. Guptill, Whittier, Calif., assignors to Texaco Inc., a corporation of Delaware
Filed Sept. 23, 1958, Ser. No. 762,777
1 Claim. (Cl. 48—215)

This invention relates to a process for the production of synthesis gas, i.e. carbon monoxide and hydrogen, by the partial oxidation of hydrocarbons. The process of this invention is particularly applicable to the production of synthesis gas from normally liquid hydrocarbons, for example, crude oil, hydrocarbon distillates, and heavy residua from petroleum refining operations.

In one of its more specific aspects, this invention relates to a method of disposing of carbon produced as a by-product in the production of synthesis gas from liquid hydrocarbons by partial oxidation. In another of its more specific aspects, this invention relates to a unitary process for the production of ammonia.

In the generation of carbon monoxide and hydrogen from liquid hydrocarbons by partial oxidation, some free carbon, or carbon black, is inevitably produced. Such carbon production is considered undesirable, as the carbon tends to accumulate on the apparatus, particularly on the surface of heat exchangers, and generally must be removed from the gas stream prior to use of the gas. Although potentially valuable as a by-product, generally there is no market for the carbon so that it presents a disposal problem after its removal from the gas stream. If the synthesis gas is utilized as a source of relatively pure hydrogen, for example, for the production of ammonia, the carbon must be removed before shift conversion (i.e. reaction of steam with carbon monoxide) to avoid plugging the catalyst with carbon.

We have found, contrary to popular belief, that with liquid hydrocarbons, particularly heavy petroleum oils, it is desirable to produce a small, but significant, controlled amount of carbon in the partial oxidation reaction for the protection of refractory and that the carbon may be readily removed from the gas stream and used advantageously in our process.

In our process, liquid hydrocarbon is dispersed in steam and subjected to reaction at a temperature in the range of 1,100° C. to 1,900° C. with a gas containing free oxygen in a compact reaction zone which is free from catalytic packing or inserts. The proportions of oxygen, steam, and hydrocarbon supplied to the reaction zone, preferably preheated, are so reguated that the desired reaction temperature, for example, 1,400° C., is autogenously maintained in the reaction zone and the resulting product gas contains at least 0.5 percent but not more than about 4 percent, preferably from 1 to 2 percent, of the carbon contained in the liquid hydrocarbon feed to the reaction zone. This small percentage of the carbon orginially contained in the feed hydrocarbon is liberated within the partial oxidation reaction zone as free carbon, or carbon black. The remainder of the carbon contained in the hydrocarbon feed is converted to carbon oxides, principally carbon monoxide.

The free carbon produced in accordance with our process protects the refractory lining of the reactor from attacks by partial oxidation products, such as ash from the hydrocarbon, if any is present. It has been found that the interior surfaces of the reaction zone, generally made up of high temperature refractory oxidic materials, for example, oxides of magnesium or aluminum, are subject to attack by partial combustion products of heavy oils. A large number of heavy oils of petroleum origin contain compounds of the heavy metals, particularly compounds of iron, nickel, and vanadium. Oxidation products of these heavy metals appear in ash contained in the products of partial combustion. We have found that, in the absence of carbon, this ash is responsible for failure of oxidic refractory in the reaction chamber, often within a very short time. We have also found, however, that the presence of small amounts of carbon in the product gas from the partial oxidation reaction protects the oxidic refractory lining material from attack by the partial combustion products. The protection of the refractory liner of the reaction chamber has been found to be particularly effective against attack from the partial combustion products of heavy crude oils and hydrocarbon residua from petroleum refining operations.

We have found, also, that the controlled amount of carbon contained in the raw synthesis gas, i.e. the mixture of carbon monoxide and hydrogen produced in the partial oxidation reaction, is not troublesome and that there are no problems of carbon accumulation in the apparatus used in carrying out our process, or in subsequent catalytic operations, such as shift conversion. When the hot gases leave the partial oxidation reaction zone they are immediately quenched from the high temperature (about 1,100° C.) by direct contact with liquid water in an amount in excess of that which may be vaporized by the heat contained in the hot gases. The carbon is readily wet by the unvaporized water and trapped therein.

Our quenching and scrubbing operation has a number of advantages. The gas from the generator is cooled in a very short period of time, usually in about 0.2 to 0.5 second, to a temperature below about 250° C., thereby effectively preventing any undesirable reactions which might occur upon slower cooling of the gas; the free carbon is effectively and substantially completely removed from the gas stream as a dispersion in water; and steam needed for subsequent shift conversion operations is generated and added to the gas stream. By supplying water to the quench and scrubbing operation, preferably water at approximately the vaporization temperature at the existing pressure, e.g. 8 to 40 atm., the needed steam is generated directly from the water without the necessity for boilers or heat exchangers with their attendant carbon accumulation problems. Maximum utilization of the heat available in hot gas for the production of steam necessary for the shift converter is achieved. It is possible to produce in this manner all of the steam necessary for the shift conversion reaction. Carbon monoxide produced in the process may be readily converted to carbon dioxide, with the simultaneous production of hydrogen, by reaction of steam with carbon monoxide at a temperature in the range of about 370 to about 480° C. over an iron catalyst.

Carbon dioxide, unreacted steam and carbon monoxide, and other impurities are removed from the product stream from the shift conversion step to produce pure hydrogen. Carbon dioxide may be removed by condensation and absorption in water, methanol, monoethanolamine, or light hydrocarbons. Water is generally removed by condensation followed by contact with a suitable desiccant, such as silica gel. Unconverted carbon monoxide may be removed by condensation or by contact with an aqueous solution of a copper salt, e.g. cuprous ammonium acetate.

For the production of ammonia, we prefer to remove the carbon dioxide and water vapor as outlined above, and then contact the hydrogen-rich gas stream with substantially pure liquid nitrogen. This condenses almost entirely all impurities from the gas stream, including carbon monoxide, methane, and argon. Argon is usually present from the atmospheric oxygen used in the partial oxidation step. A preferred procedure is to fractionate air by liquefaction and rectification to produce a stream of nitrogen having a purity in excess of 99 percent and an oxygen stream of at least 95 percent purity. Commercial nitrogen of over 99.9 percent purity may be so obtained. The oxygen from the air fractionation plant is supplied to the synthesis gas generators, while the substantially pure nitrogen is used to wash the hydrogen stream free from impurities.

The nitrogen wash step is carried out at essentially the pressure at which the gas is generated and at low temperature so that liquid nitrogen containing impurities removed from the hydrogen stream is withdrawn from the nitrogen wash step. The nitrogen wash is preferably a countercurrent contacting operation. Some nitrogen is vaporized into the gas stream during the nitrogen wash operation. Any additional nitrogen necessary for the synthesis of ammonia is supplied directly from the air fractionating plant.

Nitrogen and hydrogen in the desired proportions for ammonia synthesis are passed over an ammonia synthesis catalyst at synthesis temperature and pressure, converting nitrogen and hydrogen to ammonia. Generally, the pressure is above 69 atm., e.g., 70 to 680 atm., and the temperature is about 455 to 540° C. With an iron catalyst, temperatures of about 480 to 510° C. are adequate at a pressure of 34 atm.

Preferably the reaction zone is a refractory lined cylindrical pressure vessel having an internal surface not greater than 1.5 times the surface of a sphere of equal volume with an inlet opening at one end and a discharge opening at its opposite end. The reactants preferably are introduced through a central opening at the inlet end of the reactor and the reaction products which comprise hydrogen, carbon monoxide, and free carbon, discharged from the opposite end. The hydrocarbon oil and oxygen-containing gas are separately introduced in proper proportions into the reaction zone where the final mixing of reactants takes place. The final mixing of the oxygen-containing gas and the oil-steam dispersion perferably is effected by impingement of the separately introduced streams upon one another within the reaction zone with each of said streams moving at a velocity in excess of about 6 meters per second, preferably in excess of about 10 meters per second. The hydrocarbon oil may be atomized with steam, but in a preferred procedure, the hydrocarbon oil is injected into a stream of steam flowing at a velocity in excess of 6 meters per second, and preferably in excess of about 10 meters per second, and passed through a conduit, preferably with external heating, into the reaction zone while flowing at said velocity. By admixing the steam required for the reaction with the hydrocarbon oil in this manner an intimate dispersion of the oil in the form of vapor or small droplets suspended in the steam is obtained. A high degree of dispersion is obtained by passing the stream of steam carrying said hydrocarbon oil through a conduit for a distance at least 100 times the diameter of the conduit. The oil-steam dispersion is preferably preheated to a temperature within the range of from about 300° C. to about 500° C., preferably about 400 to 425° C.

Air, oxygen-enriched air, i.e., air containing more than about 40 mol percent oxygen, or substantially pure oxygen may be used in the process. Commercially pure oxygen, i.e., oxygen of 95 to 98 mol percent purity, is generally preferred. Enriched air is sometimes advantageous, particularly if the product gas is to be used for the synthesis of ammonia. Generally from about 2.7 to about 3.8 gram mols of free oxygen are required for each thousand kilogram calories of gross heating value of the oil fed to the reactor. The free oxygen requirements are generally within the range of about 0.6 to 1.3 kg./kg. of liquid hydrocarbon, while the steam requirements range from about 0.2 to about 3.0 kg./kg. of liquid hydrocarbon. Examples of typical feed proportions are 0.5 to 0.6 kg. of steam and 1.0 to 0.95 kg. of free oxygen, respectively, per kilogram of oil.

The hot synthesis gas from the generator at reaction temperature and pressure is brought into direct contact with liquid water effecting quench cooling of the hot synthesis gas within a period of less than about 0.5 second, following which the gas is scrubbed with an excess of water effecting substantially complete removal of the carbon from the gas stream. The carbon contained in the quench and scrub water is transferred to a liquid hydrocarbon, suitably a minor proportion of the feed hydrocarbon, and the dispersion of carbon in oil utilized as fuel for the generation of steam for the reaction and for the preheating of reactants. In this manner advantage is taken of the entire fuel value of the hydrocarbon feed to the process to supply the necessary heat requirements of the process and generate synthesis gas.

The transfer of carbon from the water dispersion to heavy fuel oil may be accomplished by contacting the carbon-water dispersion with fuel oil directly, with the result that the carbon is transferred from the water to the fuel oil. However, since the specific gravity of some of the fuel oils suitable for use in the process is very near 1, there is a tendency with these oils to form emulsions with water which are not readily resolved. We prefer in such instances to transfer the carbon from the quench water to a light hydrocarbon, for example, gasoline, by directly contacting the dispersion of carbon in water with sufficient gasoline to form a fluid slurry of carbon in gasoline, and then mix the carbon-gasoline slurry with heavy oil. The resulting mixture may be used directly as fuel for the generation of steam and for preheating the reactants, if desired, but preferably the light hydrocarbon is recovered from the fuel oil-carbon mixture by vaporization, and recycled to the carbon removal portion of the process.

The drawing is a diagrammatic flow sheet representing an example of an arrangement of apparatus suitable for carrying out the process of this invention.

With reference to the drawing, water is introduced in a metered amount corresponding to the quantity of steam desired in the process by pump 5 directly into heater 6 where the water is converted to steam. Steam produced in heater 6 is discharged through line 7 and passed through line 9 into heater 10. Liquid oil is pumped at a controlled rate by pump 8 and injected into the stream of steam flowing through line 9 to preheater 10. An intimate dispersion of the oil in steam is developed by passing the mixture through an elongated tubular conduit, suitably the heating tubes of preheater 10, at a velocity in excess of 6 meters per second. Preferably the conduit has a relatively small diameter, for example, less than 25 millimeters, and a length at least 100 times its internal diameter. A part of the oil remains unvaporized and is uniformly dispersed in the steam as very small droplets or particles. Turbulent flow is maintained throughout the heater and associated piping by maintaining a velocity in excess of 6 meters per second to thereby maintain the dispersion of oil in steam. The resulting heated steam-oil dispersion is passed through line 12 and is discharged directly into the reaction zone 13 or synthesis gas generator wherein it is mixed with free oxygen entering through line 14. In the reaction chamber, partial combustion of the oil is carried out in the absence of a catalyst with the production of carbon monoxide and hydrogen together with a small amount of free carbon.

The hot product gases leaving the reaction chamber 13 are contacted directly with water in an amount in excess of that amount which may be vaporized in cooling the gas stream. Water may be injected into the hot product gases, or (as illustrated) hot product gases may be injected into water. Direct contact between gas and water results in an almost instantaneous quench cooling of the gases to a temperature equal to or below the boiling point of water at the existing pressure. In the embodiment of apparatus illustrated in the figure, the hot gas from reaction chamber 13 is brought through a tube 16 to a point below the liquid level of a relatively large volume of water maintained in a quench chamber 17. The gas bubbles through the water effecting rapid cooling of the gas and removal of carbon. The cooled gas stream containing vaporized water passes through line 18 directly to scrubber 19 where any residual carbon contained in the gas stream is removed and an additional amount of water vaporized into the gas stream. In many instances, a sufficient quantity of steam or water vapor is introduced into the gas stream in the quenching and scrubbing operation to supply the steam requirements for a subsequent shift converter. Any additional steam, if required, for shift conversion may be obtained from heater 6 or other suitable source.

Water is introduced into scrubber 19 through line 20 and continuously circulated from the bottom to the top of the scrubber by means of pump 21. Water containing carbon, generally of the order of 0.5 to 2 percent by weight, is disengaged from the gas stream and drawn from the scrubber through line 22 to quench chamber 17. The gas stream from the scrubber, saturated with water vapor, is passed through line 23 to heat exchanger 24 where it is heated to shift conversion reaction temperature and is then introduced through line 25 into shift converter 26. In the shift converter, carbon monoxide-containing gas is reacted with steam to produce carbon dioxide and hydrogen. Any additional steam required for the shift conversion reaction may be supplied through line 11. The shift conversion reaction is an endothermic reaction so that the gases leaving the shift conversion reactor are at a higher temperature than the gases entering the reactor. The heat contained in the effluent gases from the shift conversion reactor is utilized to preheat the gas stream entering the reactor; this is accomplished in heat exchanger 24. The product gas from the shift converter is discharged through line 27 to a purification system comprising an absorber 28 which effects the removal of impurities, such as carbon dioxide, from the gas stream by solution in a solvent, such as water, to produce substantially pure hydrogen suitable for hydrogenation reactions or for ammonia synthesis. The impurities are eliminated from the solvent in stripper 29. Hydrogen is delivered through line 30.

Hot water containing carbon is drawn from quench chamber 17 through line 31 and passed to a separator 32. Liquid hydrocarbon, suitably from the same source of supply as feed to the process, and preferably heated to about the water temperature, is injected from line 33 into line 31 where it mixes with the dispersion of carbon in water. The temperature of the water is generally about 15 to 30 degrees C. below its boiling point at the existing pressure. An agitator may be utilized, if desired, to insure intimate contact between the water and oil. Carbon contained in the water is picked up by the oil effecting a transfer of the carbon from the water to the oil. Separation of the oil and carbon dispersion from the water takes place in separator 32. The temperature in the separator is generally of the order of 120 to 205° C. Oil containing carbon so removed is drawn from the separator through line 34 and sent to heaters 6 and 10 where the carbon-oil mixture is burned to supply heat for the generation of steam required in the process and for preheating the process reactants. Water from separator 32 is discharged through line 35 and recirculated to the process, preferably to heater 6 and to quench chamber 17, so that any unseparated oil and carbon contained in the water is fed back into the system and recycled.

When the oil from line 33 is a heavy hydrocarbon, for example, an oil having a specific gravity greater than about 0.94, it is desirable to supply a low boiling hydrocarbon distillate, for example, gasoline or naphtha, from line 36, to line 31 either as the sole hydrocarbon liquid supplied to the separator 32, or as an addition to the hydrocarbon from line 33. The light hydrocarbon facilitates separation by gravity of the hydrocarbon-carbon mixture from the clarified water in separator 32. Hydrocarbon distillates or mixtures of heavy oil and light hydrocarbon distillate containing recovered carbon may be used directly as furnace fuels, but in many cases it is desirable to conserve the light hydrocarbon distillates and to burn only heavy hydrocarbons and carbon as furnace fuels. In this case, hydrocarbon distillate may be recovered from the separated oil-carbon mixture leaving separator 32. This may be accomplished by passing the oil-carbon mixture to distillation zone 37. The low boiling hydrocarbon is vaporized from the heavy oil and carbon, and passes overhead to condenser 38. The heavy oil may be supplied from line 33 to either line 31 or, through line 40, to distillation zone 37, or to both. The condensed hydrocarbon distillate from zone 37 is returned through line 39 to line 31. Unvaporized heavy oil containing carbon is drawn from distillation zone 37 to line 34 as fuel.

The amount of carbon which can be incorporated in hydrocarbon oil to form a fluid mixture varies to some extent, depending upon the specific gravity of the hydrocarbon. Heavy hydrocarbons have the ability to carry a higher percentage, by weight, of added solid carbon while retaining fluidity than do light hydrocarbon distillates. Heavy fuel oils of 0.94 specific gravity or higher are capable of carrying about 15 weight percent added carbon, while light hydrocarbon distillates, e.g., gasoline, can carry only about 10 weight percent added carbon and remain fluid. By loading heavy fuel oil passed through line 34 to heaters 6 and 10 with about 10 to 15 weight percent carbon, a balance may be maintained between oil feed to the process and carbon produced, when about one percent of the carbon is unconverted in reactor 13, so that all of the carbon is consumed in the process. The carbon-oil fuel mixture may be supplied to heater 10 as part of the feed to the process, and may be put to other commercial uses, particularly in the generation of steam required for plant operations.

Water separated from the carbon and oil in separator 32 may be freed of its small residual oil content and recycled to scrubber 19 or made available for other purposes in the plant. Removal of residual oil from the water is illustrated in the drawing. Hot water from the separator is withdrawn from line 35 through line 41 and through a pressure reducing valve 42 into separator 43. Reduction of pressure causes some of the water to vaporize forming steam. The resulting steam carries the oil in vapor phase overhead from separator 43 through line 44. The deoiled water may then be recycled by pump 45 through line 46 to line 20 for use in scrubber 19, or utilized elsewhere in the system, as required.

*Example*

Synthesis gas is produced by partial oxidation of bunker fuel oil with oxygen and steam at a temperature of 1,426° C. (2,600° F.) and a pressure of 18 atmospheres (250 pounds per square inch gauge). Bunker fuel oil of 10° API gravity is used. This oil has a gross heating value of 10,120 kg. cal. per kg. (18,180 B.t.u. per pound) and a total carbon content of 85 weight percent. The oil is dispersed in steam and supplied to an unpacked cylindrical reactor at the rate of 989 kg. (2,184 pounds) of oil and 499 kg. (1,100 pounds) of steam per hour. Oxygen of 95 volume percent purity is supplied to the reactor at the rate of 736.3 standard cubic meters (26,000 standard cubic feet) per hour. One percent of the carbon contained in the fuel oil supplied to the synthesis gas generator appears as free carbon, or carbon black, suspended in the product gas. The hot synthesis gas comprising 2,810 standard cubic meters (99,300 standard cubic feet) per hour of hydrogen and carbon monoxide is cooled to approximately 205° C. (400° F.) by direct contact with water. Carbon is removed from the gas stream by scrubbing with water in a packed tower at approximately generator pressure. Water containing 0.5 weight percent carbon is withdrawn from the scrubber and contacted with light hydrocarbon distillate at the rate of approximately .28 liter of distillate per liter of water. The scrubber water, carbon, and hydrocarbon distillate are thoroughly mixed by passing the crude mixture through a V-port valve set to maintain a pressure drop of about 1.7 atmospheres (25 pounds per square inch) across the valve. The hydrocarbon distillate has an API gravity of 64° and an ASTM distillation boiling range of about 60 to 150° C. (145 to 300° F.).

The mixture of water, hydrocarbon, and carbon is passed into a closed separator tank having a volume sufficient to permit a residence time of 30 minutes under normal operating conditions. The carbon from the scrubber water is picked up in the hydrocarbon, forming a slurry which floats on top of the clarified water in the separator. The temperature in this separator is about 120° C. (250° F.). Clarified water is withdrawn from the separator and returned to the system. The hydrocarbon-oil slurry is withdrawn from the separator and contacted with one fourth its volume of bunker fuel oil having a gravity of 10° API and preheated to 205° C. (400° F.).

The mixture of carbon, light hydrocarbon distillate, and heavy fuel oil is passed into a second separator maintained at approximately the pressure of the hydrocarbon-water separator, i.e. about 16 atmosphere (220 pounds per square inch gauge). In the second separator, the light hydrocarbon is vaporized and the vapor withdrawn from the separator leaving a slurry of carbon in heavy fuel oil. The light hydrocarbon vapor is condensed and returned into contact with additional water-carbon dispersion from the gas scrubber. Heavy oil containing 10.35 weight percent free carbon recovered from the synthesis gas is supplied to the preheaters to meet the fuel requirements for generating steam and preheating the oil supplied to the synthesis gas generator.

Obviously many modifications and variations of the invention, as hereinbefore set forth, may be made without departing from the spirit and scope thereof, and therefore only such limitations should be imposed as are indicated in the appended claim.

We claim:

A process for the production of carbon monoxide and hydrogen substantially free from contamination with normally liquid hydrocarbons which comprises subjecting a liquid hydrocarbon to partial oxidation under elevated pressure in the range of 8–40 atmospheres and an autogenous temperature within the range of 1100° C. to 1900° C. with oxygen and steam to produce a hot gaseous product comprising carbon monoxide and hydrogen and containing uncombined carbon corresponding to at least 0.5 and not more than about 4 percent of the carbon in the liquid hydrocarbon, bringing said products into direct contact with water under said elevated pressure effecting cooling of said hot gas stream and removal of said carbon from the cooled gaseous reaction products thereby forming a dispersion of carbon in hot water at a temperature within the range of 250 to 400° F., contacting said carbon-water dispersion under said elevated pressure and temperature with light hydrocarbon distillate effecting transfer of said carbon to said hydrocarbon distillate and forming a slurry of carbon in hydrocarbon distillate, separating at said elevated pressure said slurry of carbon in hydrocarbon distillate from resulting clarified water substantially free from carbon and containing a small residual amount of said hydrocarbon, passing said clarified water at said elevated tempearture to a separator maintained at a pressure lower than said elevated pressure effecting flash vaporization of a portion of said water to steam and simultaneously vaporizing said residual hydrocarbon, separately withdrawing resulting vapors and resulting hydrocarbon-free water from said separator, repressuring said water free of said residual hydrocarbon distillate and passing said repressured water substantially free from hydrocarbons into contact with hot gaseous products of said partial oxidation reaction as cooling and scrubbing medium.

References Cited in the file of this patent

UNITED STATES PATENTS

| | | |
|---|---|---|
| 1,390,230 | Bates | Sept. 6, 1921 |
| 1,425,577 | Clancy | Aug. 15, 1922 |
| 2,430,085 | Spencer et al. | Nov. 4, 1947 |
| 2,641,534 | Krejci | June 9, 1953 |
| 2,665,980 | Carkeek | Jan. 12, 1954 |
| 2,684,896 | Coghlan | July 27, 1954 |
| 2,754,267 | Bondi | July 10, 1956 |
| 2,781,246 | Goldtrap | Feb. 12, 1957 |
| 2,793,938 | Frank | May 28, 1957 |
| 2,867,508 | Wood et al. | Jan. 6, 1959 |

OTHER REFERENCES

Chemical Engineering, volume 60, No. 7, July 1953, page 133.